Feb. 19, 1963 L. H. MORIN 3,077,727
PLASTIC TRAVELER HAVING A WEAR-RESISTANT SECTION
Filed May 13, 1959
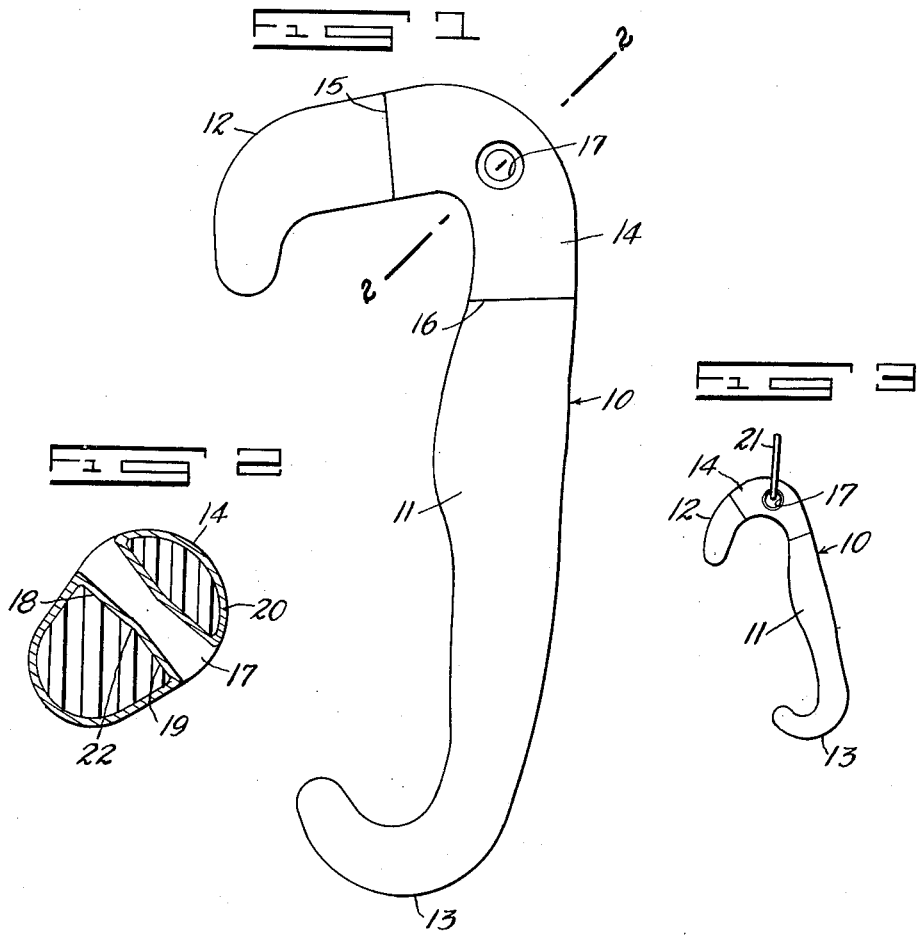
INVENTOR.
LOUIS H. MORIN
BY
Howard E. Thompson
ATTORNEY

United States Patent Office 3,077,727
Patented Feb. 19, 1963

3,077,727
PLASTIC TRAVELER HAVING A WEAR-RESISTANT SECTION
Louis H. Morin, Bronx, N.Y., assignor to Coats & Clark Inc., New York, N.Y., a corporation of Delaware
Filed May 13, 1959, Ser. No. 812,908
2 Claims. (Cl. 57—125)

This invention relates to plastic travelers employing large and small hook end portions. More particularly, the invention deals with the provision of a coating of wear resistant material on a sectional portion of the large hook end of the traveler, as well as the method of applying said material to said sectional portion in taking up the wear of the traveler in the use thereof.

Still more particularly, the invention deals with a traveler of the class described, wherein said sectional portion of the large hook end is apertured to facilitate the application of the hard wearing material to the sectional portion in accordance with the method hereinafter set forth.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side view of a traveler on a very much enlarged scale, indicating in marked lines a sectional portion of the traveler where the hard or long wearing surface material is arranged.

FIG. 2 is an enlarged section on the line 2—2 of FIG. 1, diagrammatically illustrating the wear material on said sectional portion of the traveler; and FIG. 3 is a diagrammatic view illustrating the manner of handling the traveler in carrying the method into effect, FIG. 3 being on a considerably smaller scale than the showing in FIG. 1.

Considering FIG. 1 of the drawing, 10 represents a traveler having a reasonably long shank 11 terminating in a large hook end portion 12 at one end and a small hook end portion 13 at the opposed end. The large hook end 12 joints the shank 11 in a rounded wear portion or section 14 which, in the construction shown, extends from the line 15 to the line 16. Substantially centrally of the section 14 is an aperture 17 opening through opposed sides of the section 14, the aperture flaring outwardly to both sides, as indicated by the flared lines 18 and 19, respectively, in FIG. 2 of the drawing.

In FIG. 2 of the drawing, 20 represents diagrammatically, and somewhat exaggerated as to size, the coating of wear material extending over the entire section 14, including the walls of the aperture 17. The material 20 can comprise chrome or carboloy or any similar hard wearing material and, in applying the wear material 20 to the section 14, the following is a method of procedure which can be followed.

The first step in the method is to block-off the shank and small hook end 13 from the line 16 and also the hook end portion 12 from the line 15 with a coating of non-conductive material, whereupon the traveler is emersed in a bath containing silver nitrate, formaldehyde and glucose, until such time as a thin coating of silver will be deposited over the entire section 14, including the walls of the aperture 17.

The traveler is then hung upon a hook 21, as diagrammatically seen in FIG. 3 of the drawing, and is submerged in a plating solution, so that a chrome or carboloy plating can be deposited on the section 14, it being understood that the supporting hook 21 establishes a direct conductor contact with the silver deposit which facilitates the electro-plating operation.

It will be apparent that the flared ends 18 and 19 of the aperture 17 form a contracted central portion, as at 22, which will form a substantially line contact with the supporting hook 21, thus facilitating a substantial complete plating on the walls of the aperture 17.

In the sectional showing of FIG. 2 of the drawing, no attempt is made to illustrate the initial silver deposit. The diagrammatic showing of the deposit at 20 is to illustrate the combination of the silver plus the final wear resistant material.

In accordance with my method, it will be understood that any type of electrically conductive coating can be applied to the section 14 of the traveler, to which the hard metal can be electro-deposited. Further, one metal can be electro-deposited upon the conductive coating, after which, another hard wear resistant metal or material can be electro-deposited on the first deposited metal as, for example, the final deposit of the chrome-plate.

With my improved method, the wear section of a traveler can be protected with the wear resisting coating in a simple and economical manner and the end product will still be reasonably light in weight, particularly as compared with other travelers of this type and kind where heavy or bulky wear elements have been incorporated in and constitute a part of the traveler.

Having fully described my invention, what I claim as new and desire to secure by Letters Patent is:

1. A traveler having large and small hook end portions joined by a shank, the large hook end portion joining the shank in a rounded section, said rounded section having a coating of chromium completely encircling said section, said section including an aperture opening through opposed sides of the section, said coating extending onto the walls of said aperture and joining together said chromium coating on said opposed sides of said section.

2. A traveler as defined in claim 1, wherein the walls of said aperture flare outwardly to opposed sides of the section.

References Cited in the file of this patent
UNITED STATES PATENTS

| | | |
|---|---|---|
| 1,892,755 | Scheppmann | Jan. 3, 1933 |
| 1,970,723 | Wolfe | Aug. 21, 1934 |
| 2,052,735 | Wentworth | Sept. 1, 1936 |
| 2,064,548 | Land | Dec. 15, 1936 |
| 2,424,583 | Rahm | July 29, 1947 |
| 2,438,205 | Coats | Mar. 23, 1948 |
| 2,682,501 | Teal | June 29, 1954 |
| 2,683,112 | Reindl et al. | July 6, 1954 |
| 2,683,346 | Pieper | July 13, 1954 |
| 2,783,193 | Nieter | Feb. 26, 1957 |

OTHER REFERENCES

Morisset et al.: Chromium Plating, Draper Ltd., England, 1954, p. 260 and p. 270.